March 1, 1927.
N. A. FREAN
1,619,713
TRAP DEVICE FOR SEPARATING WATER FROM PETROL
Filed July 7, 1926
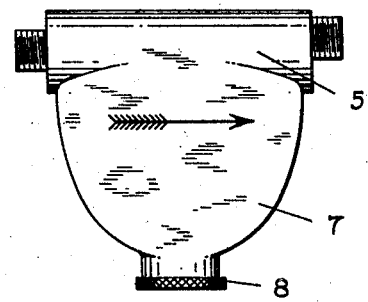
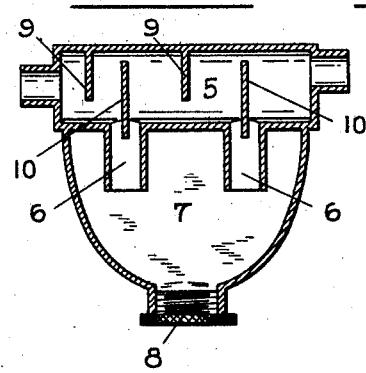 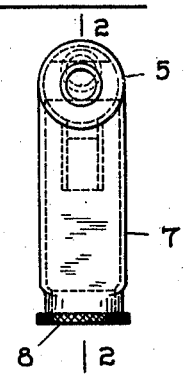
INVENTOR
NORMAN A. FREAN
BY
ATTORNEYS

UNITED STATES PATENT OFFICE.

NORMAN ALFRED FREAN, OF MOUNT BARKER, SOUTH AUSTRALIA, AUSTRALIA.

TRAP DEVICE FOR SEPARATING WATER FROM PETROL.

Application filed July 7, 1926, Serial No. 121,016, and in Australia October 28, 1925.

This invention comprises an improved device for separating from petrol any water, dirt or other impurity heavier than the petrol.

It consists in the insertion in the petrol supply pipe at a convenient point between the petrol tank and the carburettor of a short length of tube (which I term a "filter tube") placed horizontally and being preferably of somewhat larger diameter than that of the pipe, such tube having projecting from its underside two or more vertical pipes which connect it with the upper part of a sump that has at the bottom a drain tap or plug whereby the water and other impurity extracted from the petrol may be drawn off from time to time, such tube containing also a plurality of baffle plates placed alternately in its upper and lower parts.

In order that my invention may be the more clearly understood I will describe the same with reference to the accompanying drawings in which—

Fig. 1 is a side view of my separator. The direction of flow of the petrol is indicated by the arrow, Fig. 2 is a central section on line 2, 2 of Fig. 3, and Fig. 3 is an end view of my separator, showing the delivery end.

In the drawings 5 represents the short length of tube which I term the filter tube, and 6, 6 represent two short lengths of pipe which communicate with and project downwardly from the tube 5. 7 represents the sump which is attached to the underside of the tube 5 and which encloses the pipes 6, 6. At the bottom of the sump 7 is a drainage plug 8.

The filter tube 5 is fitted with a plurality of baffle plates 9, 9 and 10, 10 placed alternately in its upper and lower parts. The lower baffle plates 10, 10 correspond in number to the vertical pipes 6, 6 one being placed at the centre of each pipe and rising to somewhat above the centre of the tube and projecting down well into the pipe 6 so that the upper end of the pipe is divided into two. The upper baffle plates 9, 9 are placed intermediate of the lower plates and extend from the top downward.

The pipe from the petrol tank enters the end of the filter tube 5 at about its centre, the pipe to the carburettor leaves the filter tube at its topmost part.

The several parts comprising my complete separator are securely fastened together by brazing or other convenient means.

The operation of my separator is as follows—

As the petrol with its contained impurities flows from the tank into the filter tube 5 it strikes the first upper baffle plate 9 and is forced down to the bottom of the tube whence it passes onward to the lower baffle plate 10 the petrol with possibly some small amount of water or other impurity rising and passing over same while most of the water and other impurities passes down the same into the pipe 6 and thence to the sump 7. The petrol with any water or other impurity that has passed with it over the first baffle plate 10 then passes under the second plate 9 and thence onward to the second plate 10 the petrol rising and flowing over the top of this while the remaining water and other impurities fall to the bottom of the tube slide down the face of the baffle plate and thence down the pipe 6 into the sump.

My separator does not require the use of any gauze or other material likely to become blocked or choked with dirt and water.

What I claim is—

A device for separating water from petrol in its passage to a motor, comprising a short length of tube arranged horizontally and having inlet and outlet openings at its ends adapted to be connected respectively with a supply pipe and a motor, a sump secured to the under side of the tube and having a drain plug in its bottom, pipes projecting from the under side of the tubes into the sump, and providing communication between the tube and sump, and a plurality of baffle plates arranged alternately across the upper and lower parts of said tube, the lower baffle plates corresponding in number with the said pipes and each arranged at the center of a pipe and projecting a short distance into the same, substantially as described and for the purpose set forth.

In testimony that I claim the foregoing as my invention I have signed my name this 25th day of May, 1926.

NORMAN ALFRED FREAN.